(12) United States Patent
Miller et al.

(10) Patent No.: US 11,454,613 B2
(45) Date of Patent: Sep. 27, 2022

(54) DEAD ZONE INSPECTION WITH ULTRASONIC TESTING USING SIGNAL INTEGRATION

(71) Applicant: The Boeing Company, Chicago, IL (US)

(72) Inventors: Sondra Hennessy Miller, Summerville, SC (US); David Michael Gayle, Summerville, SC (US); John William Adams, North Charleston, SC (US); Mark Richard Brei, Ladson, SC (US); Kevin D. Gordon, Summerville, SC (US); Christopher Garnier, Ladson, SC (US)

(73) Assignee: The Boeing Company, Chicago, IL (US)

( * ) Notice: Subject to any disclaimer, the term of this patent is extended or adjusted under 35 U.S.C. 154(b) by 170 days.

(21) Appl. No.: 16/891,216

(22) Filed: Jun. 3, 2020

(65) Prior Publication Data
US 2021/0382015 A1    Dec. 9, 2021

(51) Int. Cl.
*G01N 29/44* (2006.01)
*G01N 29/265* (2006.01)

(52) U.S. Cl.
CPC ....... *G01N 29/265* (2013.01); *G01N 29/4427* (2013.01); *G01N 2291/044* (2013.01); *G01N 2291/2694* (2013.01)

(58) Field of Classification Search
CPC ............. G01N 29/4454; G01N 29/265; G01N 29/2437; G01N 29/043; G01N 29/38;
(Continued)

(56) References Cited

U.S. PATENT DOCUMENTS

| 6,037,704 A | * | 3/2000 | Welle | H04B 11/00 310/316.01 |
| 6,220,099 B1 | * | 4/2001 | Marti | G01N 27/902 73/633 |

(Continued)

FOREIGN PATENT DOCUMENTS

| EP | 1057012 B1 | 11/2003 | |
| KR | 100376809 | * 3/2003 | ........... G01N 29/265 |

OTHER PUBLICATIONS

Angelika Wronkowicz et al; Composite Structures; Assessment of uncertainty in damage evaluation by ultrasonic testing of composite structures; Elsevier 2018.

(Continued)

*Primary Examiner* — Jacques M Saint Surin
(74) *Attorney, Agent, or Firm* — Duft & Bornsen, PC

(57) ABSTRACT

An ultrasonic inspection system, method, and software. In one embodiment, the ultrasonic inspection system includes an ultrasonic probe that directs ultrasound waves into a structure from a front wall, and receives reflected waves to generate a response signal. The system further includes a processor that rectifies the response signal to generate a rectified signal, integrates a portion of the rectified signal within a detection time window to determine an energy sum, and generates output based on the energy sum. The detection time window is restricted to a front wall reflection and at least a portion of a near-surface dead zone following the front wall reflection.

20 Claims, 12 Drawing Sheets

(58) Field of Classification Search
CPC ........... G01N 29/4481; G01N 29/0645; G01N 29/4427; G01N 2291/044; G01N 2291/045; G01N 2291/2694; G01N 2291/0234; G01N 2291/0289; G01N 2291/0231; G01N 2291/101
USPC ......................................................... 73/622
See application file for complete search history.

(56) References Cited

U.S. PATENT DOCUMENTS

| | | | | |
|---|---|---|---|---|
| 6,637,266 | B1* | 10/2003 | Froom | G01M 5/0016 73/583 |
| 6,996,480 | B2* | 2/2006 | Giurgiutiu | G01M 5/0033 702/159 |
| 7,199,367 | B2* | 4/2007 | Favro | G01N 3/60 250/341.1 |
| 7,215,191 | B2* | 5/2007 | Maejima | H03G 3/3026 330/10 |
| 8,358,077 | B2* | 1/2013 | Anissimov | G01R 19/22 315/200 R |
| 10,352,911 | B2* | 7/2019 | Fischer | G01N 29/343 |
| 10,620,162 | B2* | 4/2020 | Karaffa | G01N 29/4418 |

OTHER PUBLICATIONS

Development Focus, Difficult Flaws Located; Electronics Weekly; Nov. 1972.
European Search Report; Application EP21176562; dated Oct. 11, 2021.

* cited by examiner

DEAD ZONE INSPECTION WITH ULTRASONIC TESTING USING SIGNAL INTEGRATION

FIELD

This disclosure relates to the field of non-destructive inspection or evaluation of structures.

BACKGROUND

Non-destructive inspection (NDI) involves examining a structure without harming, damaging, or physically altering the structure in a permanent manner. For example, one particular application of NDI is in the aircraft industry to inspect aircraft structures for damage or defects (flaws) in the structure during manufacturing, and/or after the structure has been put into service. Ultrasonic testing is one type of NDI technique. In a pulse-echo mode of ultrasonic testing, a probe sends ultrasound waves into the structure, and detects reflections or echoes of the ultrasound waves off of reflectors (e.g., front wall, back wall, an anomaly or imperfection within the structure, etc.). The elapsed time between emission of ultrasound waves and receipt of a reflection at the probe indicates a depth of a reflector. A typical probe has a piezoelectric element (i.e., transducer) that acts as a transmitter and a receiver. The piezoelectric element oscillates in response to an excitation pulse when acting as a transmitter to emit ultrasound waves, and oscillates in response to reflections when acting as a receiver to generate a response signal. After an initial oscillation, the piezoelectric element will continue to reverberate for a time interval, which is referred to as ring down. The ring down of the piezoelectric element creates a dead zone beneath the front wall of the structure, which is referred to herein as a near-surface dead zone. It remains an issue in ultrasonic testing to effectively detect an anomaly or imperfection beneath the front wall of the structure within the near-surface dead zone.

SUMMARY

Described herein are improved ultrasonic testing techniques that allow for inspection within a near-surface dead zone. As an overview, a probe emits ultrasound waves into a structure, and captures reflections to generate a response signal. The response signal from the probe (after being rectified) includes a pulse representing a reflection off the front wall of the structure. A portion of the response signal is integrated within a detection time window that encompasses the front wall reflection to measure energy of the response signal within the detection time window. Reflections off an anomaly or imperfection directly below the front wall may be superimposed on the front wall reflection, or may be captured as one or more pulses in the response signal following the front wall reflection. By summing the energy of the response signal within the detection time window, an anomaly or imperfection may be detected in the near-surface dead zone. One technical benefit is that ultrasonic testing is improved by detecting an anomaly or imperfection directly below the front wall of the structure that was previously undetectable with ultrasonic testing.

One embodiment comprises an ultrasonic inspection system. The ultrasonic inspection system includes an ultrasonic probe configured to direct ultrasound waves into a structure from a front wall, and to receive reflected waves to generate a response signal. The ultrasonic inspection system further includes a processor configured to rectify the response signal to generate a rectified signal, to integrate a portion of the rectified signal within a detection time window to determine an energy sum, and to generate output based on the energy sum. The detection time window is restricted to a front wall reflection and at least a portion of a near-surface dead zone following the front wall reflection.

In another embodiment, the processor is configured to negative half-wave rectify and invert the response signal to generate the rectified signal.

In another embodiment, the processor is configured to positive half-wave rectify the response signal to generate the rectified signal.

In another embodiment, the processor is configured to full-wave rectify the response signal to generate the rectified signal.

In another embodiment, the processor is configured to define a null gate preceding the front wall reflection, and to nullify the rectified signal within the null gate.

In another embodiment, the processor is configured to generate C-scan data for the structure based on the energy sum.

In another embodiment, the ultrasonic inspection system further includes a robotic arm configured to move the ultrasonic probe over the structure, and a position sensor configured to determine positional data for the ultrasonic probe.

In another embodiment, the processor is configured to trigger an alert when the energy sum exceeds a threshold.

In another embodiment, the structure comprises a composite part.

In another embodiment, an opaque layer is disposed on the front wall of the composite part, and the detection time window is provisioned based on a depth of a resin pool beneath the front wall.

In another embodiment, the structure comprises a part of an aircraft.

Another embodiment comprises a method of inspecting a structure. The method comprises directing ultrasound waves into the structure from a front wall, receiving reflected waves to generate a response signal, rectifying the response signal to generate a rectified signal, integrating a portion of the rectified signal within a detection time window to determine an energy sum, and generating output based on the energy sum. The detection time window is restricted to a front wall reflection and at least a portion of a near-surface dead zone following the front wall reflection.

Another embodiment comprises a non-transitory computer readable medium embodying programmed instructions executed by a processor. The instructions direct the processor to implement a method of inspecting a structure. The method comprises directing ultrasound waves into the structure from a front wall, receiving reflected waves to generate a response signal, rectifying the response signal to generate a rectified signal, integrating a portion of the rectified signal within a detection time window to determine an energy sum, and generating output based on the energy sum. The detection time window is restricted to a front wall reflection and at least a portion of a near-surface dead zone following the front wall reflection.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
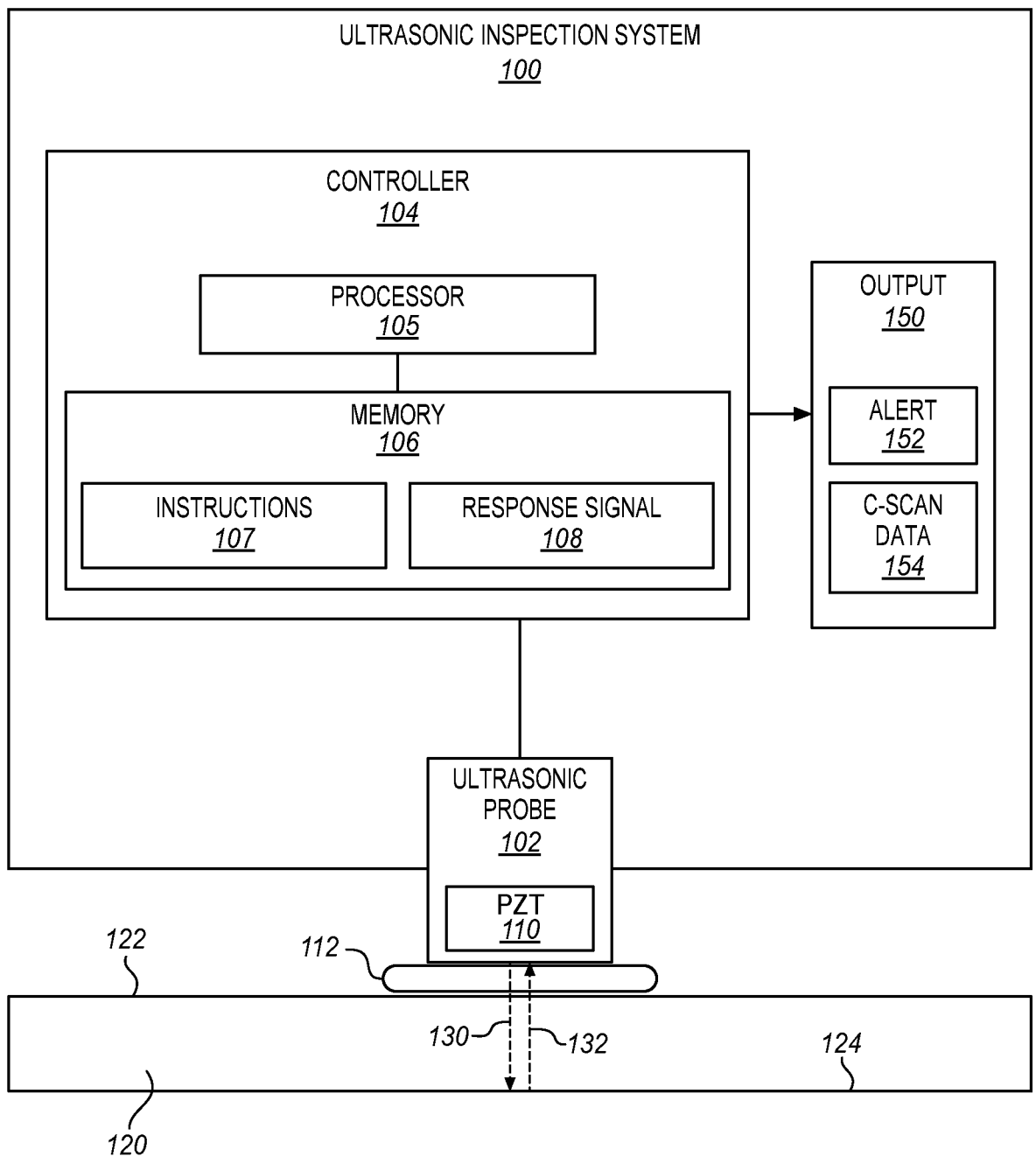
FIG. 1 is a block diagram of an ultrasonic inspection system in an illustrative embodiment.

FIG. 1 is a block diagram of an ultrasonic inspection system 100 in an illustrative embodiment. Ultrasonic inspection system 100 comprises an apparatus or collection of devices, mechanisms, or subsystems configured to perform ultrasonic testing (UT) on structures or test specimens. Ultrasonic inspection system 100 may be used to inspect any number of structures in a variety of industries where detection of flaws or defects in the structure is desired, such as in the aircraft, automotive, or construction industries. In this embodiment, ultrasonic inspection system 100 includes the following subsystems: an ultrasonic probe 102 and a controller 104. Ultrasonic probe 102 (also referred to as an ultrasonic sensor) is a device or component that transmits or emits ultrasound waves, and captures or receives reflections or echo waves. Ultrasonic probe 102 may include a single piezoelectric element (PZT) 110 or transducer that acts as a transmitter and a receiver. Controller 104 comprises circuitry, logic, hardware, means, etc., configured to provide an excitation signal (i.e., excitation pulses) to ultrasonic probe 102, to process response signals from ultrasonic probe 102, and to perform other actions for ultrasonic measurements. Controller 104 may be implemented on a hardware platform comprised of analog and/or digital circuitry. Controller 104 (as shown in FIG. 1) may be implemented on a processor 105 that executes instructions 107 stored in memory 106. Processor 105 comprises an integrated hardware circuit configured to execute instructions 107, and memory 106 is a non-transitory computer readable storage medium for data, instructions 107, etc., and is accessible by processor 105. Ultrasonic inspection system 100 may include various other components not specifically illustrated in FIG. 1. For example, ultrasonic inspection system 100 may include a power supply, a network interface, a user interface, etc.

In this embodiment, ultrasonic inspection system 100 is illustrated as performing inspection on a structure 120. The term "structure" is not meant to be limiting, as ultrasonic inspection system 100 may be used to inspect any number of parts or structures of different shapes and sizes, such as machined forgings, castings, or composite panels or parts. The inspection may be performed on newly manufactured structures or existing structures that are being inspected for preventative maintenance purposes. Further, structure 120 may be any number of materials. For example, structure 120 may be a metallic material (e.g., aluminum), a composite material, etc.

Structure 120 includes a front wall 122 (also referred to as a front surface or front face), and a back wall 124 (also referred to as a back surface or back face). Ultrasonic probe 102 is positioned proximate to front wall 122 to direct ultrasound waves 130 into structure 120 from front wall 122 in pulse-echo mode. Ultrasonic probe 102 may be in contact with front wall 122, or may be separated from front wall 122 with a delay line. Also, a couplant 112 (e.g., water or another fluid) may be disposed between front wall 122 and ultrasonic probe 102. A couplant 112 is a material that facilitates transmission of ultrasound waves 130 from ultrasonic probe 102 into structure 120. Ultrasonic probe 102 also receives reflected waves 132 (also referred to as reflections, echoes, or echo waves) as the ultrasound waves 130 reflect back off of reflectors in structure 120. Ultrasonic probe 102 transforms the reflected waves 132 into a response signal 108 that is stored or buffered in memory 106.

Figure 2:
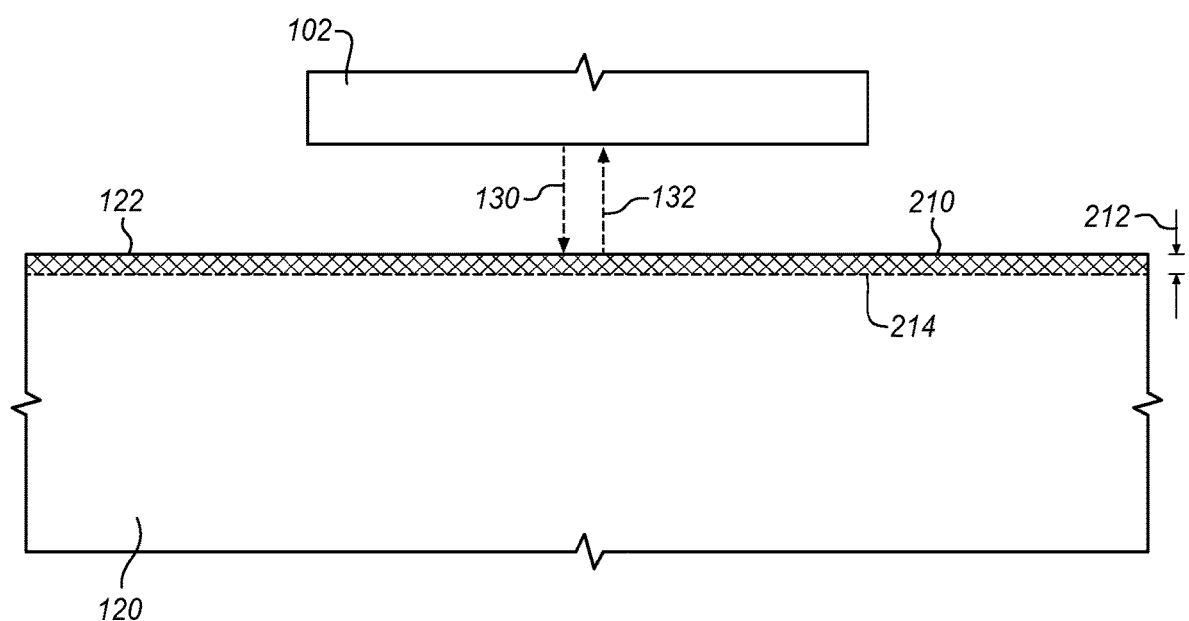
FIG. 2 is a magnified view of an ultrasonic probe and a front wall of a structure.

FIG. 2 is a magnified view of ultrasonic probe 102 and front wall 122 of structure 120. When ultrasonic probe 102 emits ultrasound waves 130 that are directed into structure 120, part of the ultrasound waves 130 will be reflected by front wall 122 and captured by ultrasonic probe 102 to generate a response signal 108. In general, there is a dead zone detection gap 210 below front wall 122 where an anomaly or imperfection is traditionally undetectable due to ring down of ultrasonic probe 102. The depth 212 of the dead zone detection gap 210 may vary depending on the frequency of ultrasound waves 130, the type of material being inspected, etc. For example, depth 212 may be less than 0.100 inches below front wall 122 for a 5 Mhz signal in a composite material. Depths below the dead zone detection gap 210 may be inspectable after ring down of ultrasonic probe 102 (i.e., ring down due to reflections off of front wall 122). Thus, the depth immediately below the dead zone detection gap 210 is referred to as the nearest inspectable depth 214 following the front wall 122.

Figure 3:
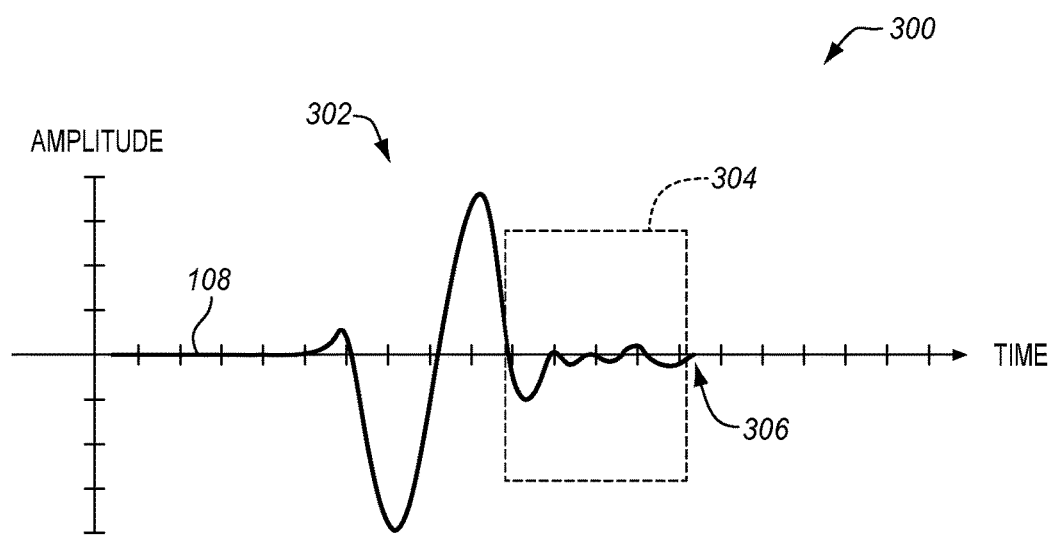
FIG. 3 is a graph illustrating a portion of a response signal.

FIG. 3 is a graph 300 illustrating a portion of a response signal 108. It is noted that the excitation or initial pulse applied to ultrasonic probe 102 is omitted from graph 300. This portion of response signal 108 (e.g., A-Scan) shows a front wall reflection 302 (also referred to as a front surface reflection), and a time interval following the front wall reflection 302. The front wall reflection 302 represents a reflection of ultrasound waves 130 off of front wall 122 of structure 120 (see FIG. 2). Piezoelectric element 110 in ultrasonic probe 102 oscillates when receiving the front wall reflection 302 to generate the response signal 108 as illustrated in FIG. 3, and continues to reverberate for a time interval after receiving the front wall reflection 302 (ring down). This creates a dead zone following front wall reflection 302, which is referred to herein as a near-surface dead zone 304. Near-surface dead zone 304 is a time interval following a reflection (e.g., front wall reflection 302) where ultrasonic probe 102 reverberates or vibrates due to the reflection. For example, the near-surface dead zone 304 may be one cycle, two cycles, three cycles, etc., of the response signal 108, depending on the damping characteristics of ultrasonic probe 102. Time 306 following the near-surface dead zone 304 represents the nearest inspectable depth 214 below the front wall 122 (see FIG. 2).

Figure 4:
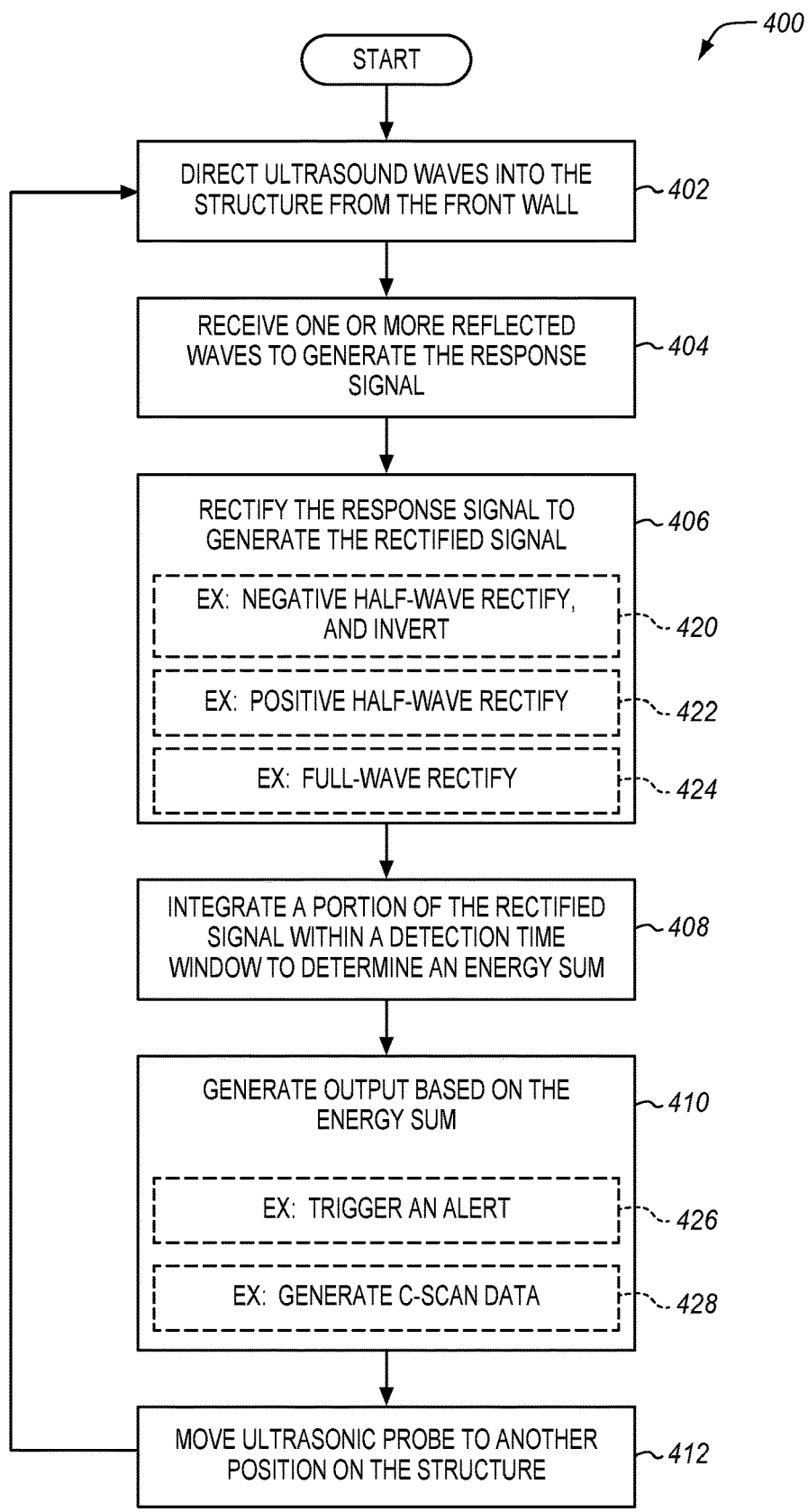
FIG. 4 is a flow chart illustrating a method of inspecting a structure in an illustrative embodiment.

In the embodiments described herein, ultrasonic inspection system 100 is able to detect an anomaly or imperfection in the near-surface dead zone 304. FIG. 4 is a flow chart illustrating a method 400 of inspecting a structure 120 in an illustrative embodiment. The steps of method 400 will be described with respect to ultrasonic inspection system 100 in FIG. 1, although one skilled in the art will understand that the methods described herein may be performed by other systems or devices. The steps of the methods described herein are not all inclusive and may include other steps not shown. The steps for the flow charts shown herein may also be performed in an alternative order.

To begin, ultrasonic probe 102 is positioned proximate to front wall 122 of structure 120 as illustrated in FIG. 1, and operates in pulse-echo mode to inspect structure 120 at this position. In pulse-echo mode, ultrasonic probe 102 transforms electrical pulses into mechanical vibrations. Thus, controller 104 (e.g., through a pulser) provides an excitation pulse to ultrasonic probe 102. In response to the excitation pulse, ultrasonic probe 102 emits, transmits, or otherwise directs ultrasound waves 130 into structure 120 from front wall 122 (step 402). Ultrasound waves 130 that are reflected from structure 120 return to ultrasonic probe 102, and are converted into a response signal 108. Thus, ultrasonic probe 102 receives or captures one or more reflected waves 132 to generate the response signal 108 (step 404). The chronological recording of the amplitude of the response signal 108 may be graphically imaged as A-Scan data as was illustrated in FIG. 3.

Figure 5:
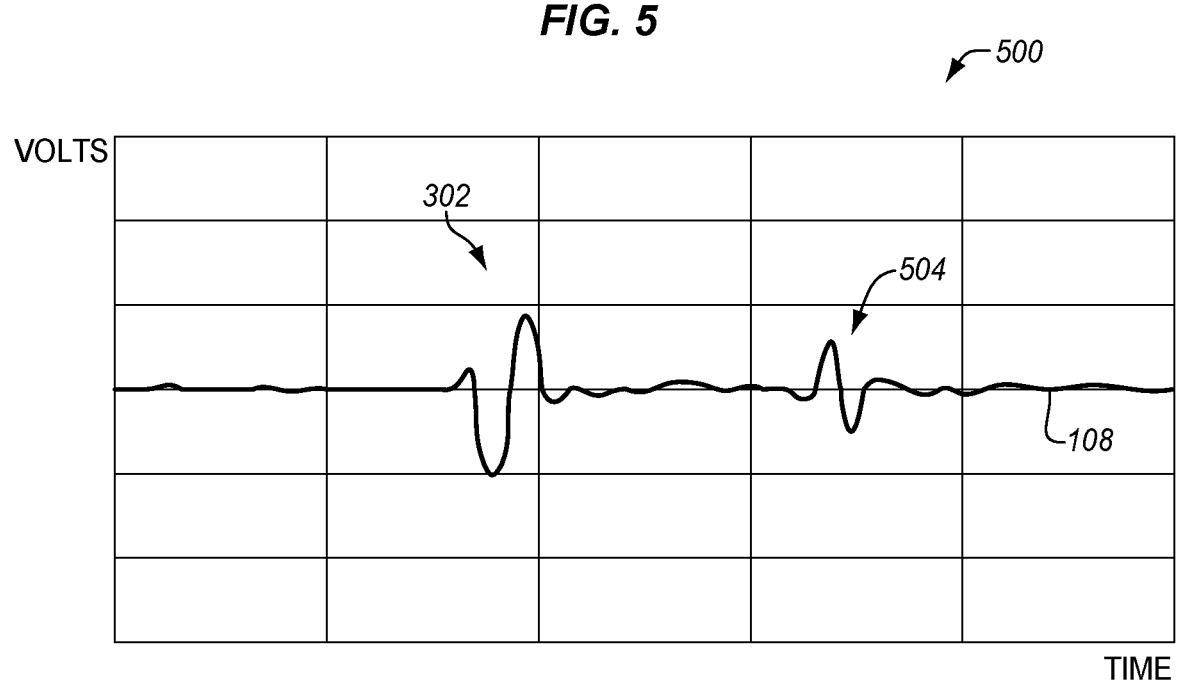
FIG. 5 is a graph illustrating a response signal in an illustrative embodiment.
Figure 6:
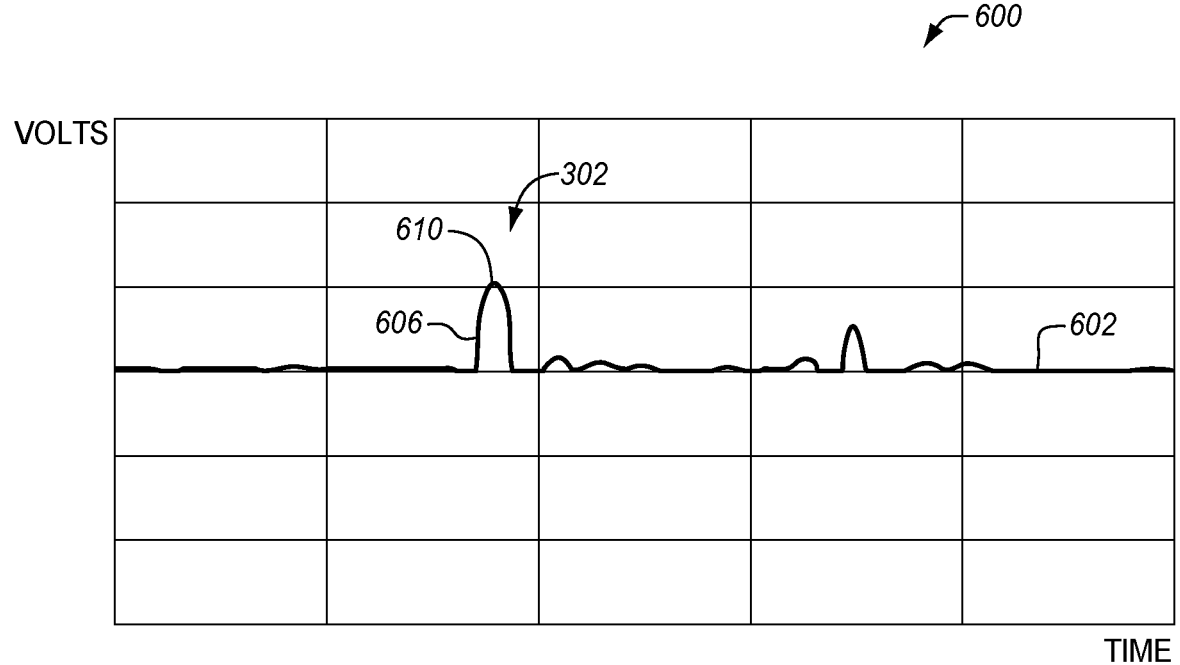
FIG. 6 is a graph illustrating a rectified signal in an illustrative embodiment.

Controller 104 receives the response signal 108 from ultrasonic probe 102, and stores or buffers the response signal 108. FIG. 5 is a graph 500 illustrating the response signal 108 in an illustrative embodiment. Graph 500 shows a front wall reflection 302 and a back wall reflection 504, which represent reflections of ultrasound waves 130 off of front wall 122 and back wall 124, respectively. In FIG. 4, controller 104 then processes the response signal 108 as follows. Controller 104 rectifies the response signal 108 to generate a rectified signal or processed signal (step 406). The rectified signal may be in the positive domain or the negative domain as desired. In one embodiment, controller 104 performs negative half-wave rectification on response signal 108 and inverts to generate a negative half-wave rectified signal (optional step 420) in the positive domain. FIG. 6 is a graph 600 illustrating a rectified signal 602 in an illustrative embodiment. In this embodiment, the response signal 108 was negative half-wave rectified and inverted to create rectified signal 602. Rectified signal 602 includes a series of pulses. The pulse having the first highest peak 610 in rectified signal 602 represents the front wall reflection 302, and may be referred to as the front wall pulse 606.

Figure 7:
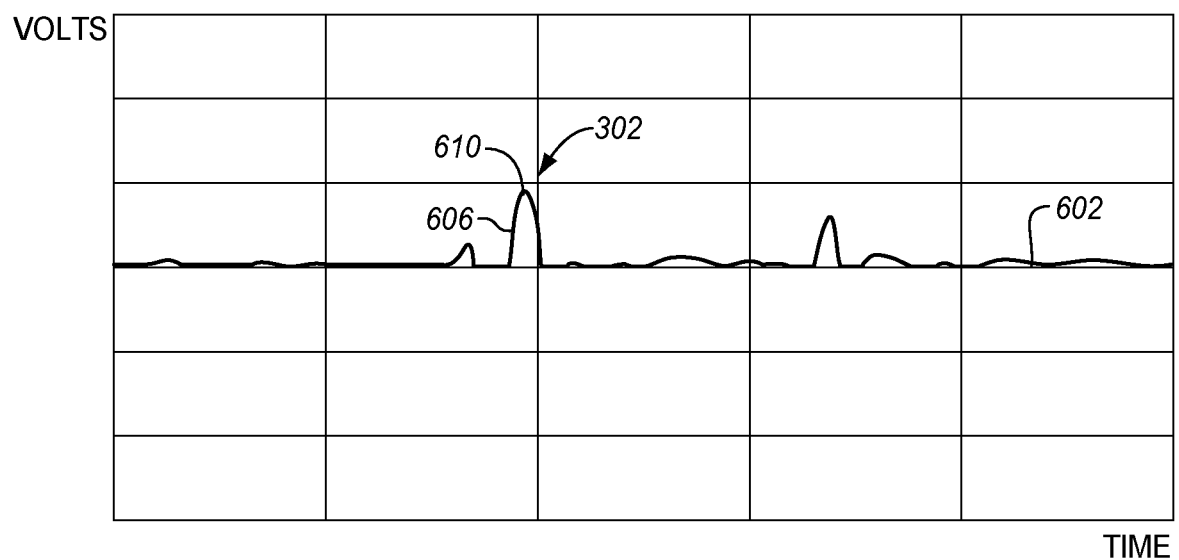
FIG. 7 is a graph illustrating a rectified signal in an illustrative embodiment.

In another embodiment, controller 104 performs positive half-wave rectification on response signal 108 to generate the rectified signal 602 (optional step 422 of FIG. 4). FIG. 7 is a graph 700 illustrating a rectified signal 602 in an illustrative embodiment. In this embodiment, the response signal 108 was positive half-wave rectified to create rectified signal 602. Again, the rectified signal 602 includes a series of pulses, and the pulse (i.e., front wall pulse 606) having the first highest peak 610 represents the front wall reflection 302.

Figure 8:
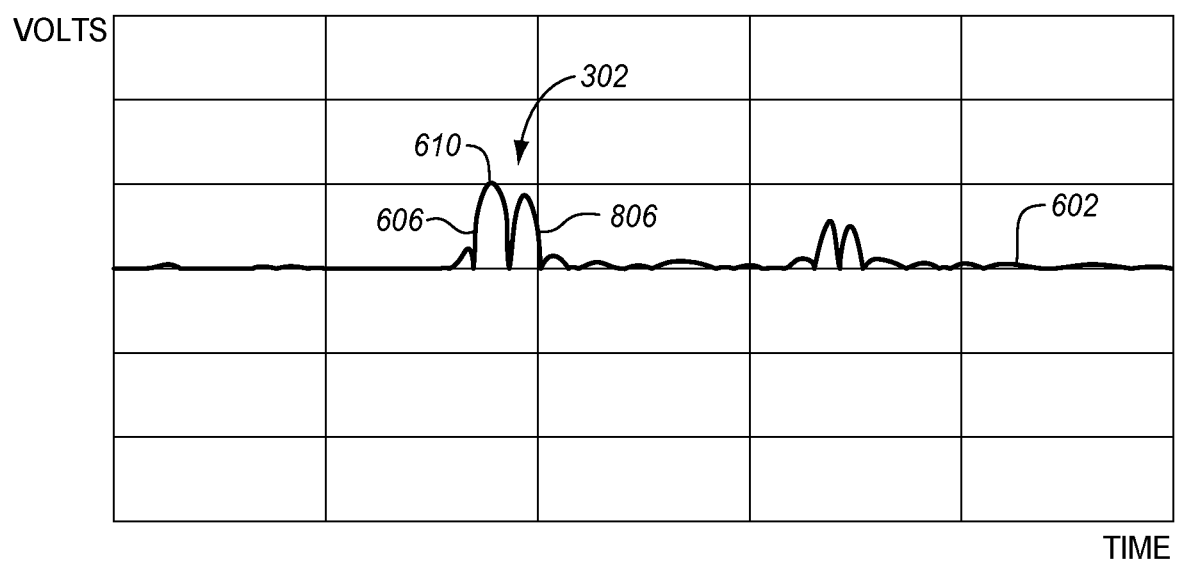
FIG. 8 is a graph illustrating a rectified signal in an illustrative embodiment.

In another embodiment, controller 104 performs full half-wave rectification on response signal 108 to generate the rectified signal 602 (optional step 424 of FIG. 4). FIG. 8 is a graph 800 illustrating a rectified signal 602 in an illustrative embodiment. In this embodiment, the response signal 108 was full-wave rectified to create rectified signal 602. In a full-wave rectified signal 602, the front wall reflection 302 is represented by two pulses: the pulse (i.e., front wall pulse 606) having the first highest peak 610, and the following pulse 806 in rectified signal 602.

Figure 9:
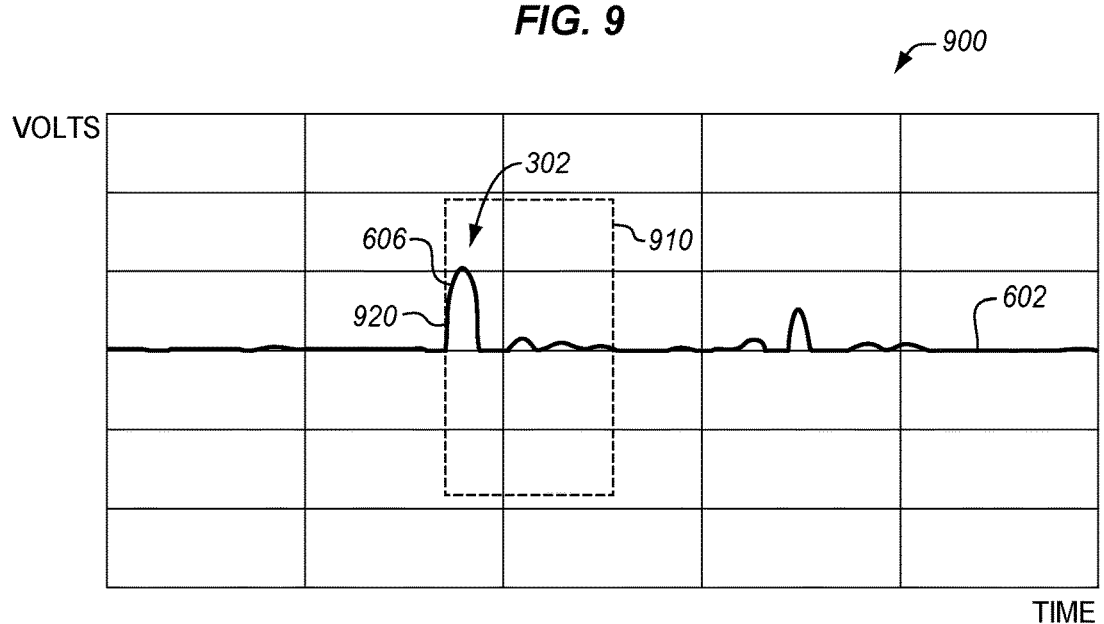
FIG. 9 is a graph illustrating a detection time window in an illustrative embodiment.

In FIG. 4, controller 104 integrates a portion of the rectified signal 602 within a detection time window (step 408). The detection time window is restricted to the front wall reflection 302 and at least a portion of the near-surface dead zone 304 following the front wall reflection 302. FIG. 9 is a graph 900 illustrating a detection time window 910 in an illustrative embodiment. Graph 900 illustrates the rectified signal 602 that was created by negative half-wave rectifying (and inverting) the response signal 108, but a similar process may be performed on a rectified signal 602 created by positive half-wave rectifying or full-wave rectifying. Different points in time along the rectified signal 602 correspond with different depths within structure 120. The detection time window 910 (also referred to as a detection gate) is limited or restricted to front wall 122 and the detection gap 210 beneath the front wall 122. In one embodiment, controller 104 defines the detection time window 910 to begin at the front wall reflection 302 (i.e., at front wall pulse 606). For example, when working in the positive domain, detection time window 910 may begin at the rising edge 920 of the front wall reflection 302, or where the rising edge 920 of the front wall reflection 302 exceeds a threshold voltage (e.g., 0.4 volts). The detection time window 910 ends a fixed time following the rising edge 920. Detection time window 910 therefore exclusively encompasses the front wall reflection 302 and the near-surface dead zone 304 following the front wall reflection 302. For example, detection time window 910 may be set or defined to end one cycle following the front wall reflection 302, two cycles following the front wall reflection 302, three cycles following the front wall reflection 302, or some other time. The size of the detection time window 910 (in time) may be provisioned based on the frequency of ultrasound waves 130, the material used for structure 120, ring down time of ultrasonic probe 102, an estimated depth of an anomaly or imperfection below front wall 122, etc. Detection time window 910 is set so that the portion of the rectified signal 602 being integrated is limited to the front wall 122 of the structure 120 and at least part of the detection gap 210 beneath the front wall 122 (e.g., beneath the front wall 122 to the nearest inspectable depth 214), and does not include other anomalies or back wall 124 that are at a depth below the detection gap 210.

By integrating in this manner, controller 104 determines an energy sum of the portion of the rectified signal 602 within detection time window 910. The energy sum may be used to indicate an anomaly or imperfection in the detection gap 210 beneath front wall 122. Reflections off an anomaly or imperfection beneath front wall 122 may be superimposed on the front wall reflection 302, which may cause the front wall pulse 606 to have a higher peak. Reflections off an anomaly or imperfection beneath front wall 122 may additionally or alternatively cause one or more additional pulses following the front wall pulse 606. Summing the energy within detection time window 910 has a technical benefit of capturing these reflections off an anomaly or imperfection beneath front wall 122 in the near-surface dead zone 304 so that the anomaly or imperfection is detectable.

In FIG. 4, controller 104 generates output 150 based on the energy sum (step 410), which is also illustrated in FIG. 1. In one embodiment, controller 104 compares the energy sum to a threshold, and triggers an alert 152 or an alarm when the energy sum exceeds the threshold (optional step 426). The alert 152 may comprise an audible alert, a visual alert, or another type of alert. In another embodiment, controller 104 generates C-scan data 154 for structure 120 based on the energy sum (optional step 428). C-scan refers to an image produced when the data collected from ultrasonic inspection is plotted as a plan view of the structure 120. Thus, the C-scan data 154 generated by controller 104 may include a data point on a C-scan image of structure 120. Ultrasonic probe 102 is then moved to another position relative to the front wall 122 of structure 120 (step 412), and method 400 may repeat at the new position.

Figure 10:
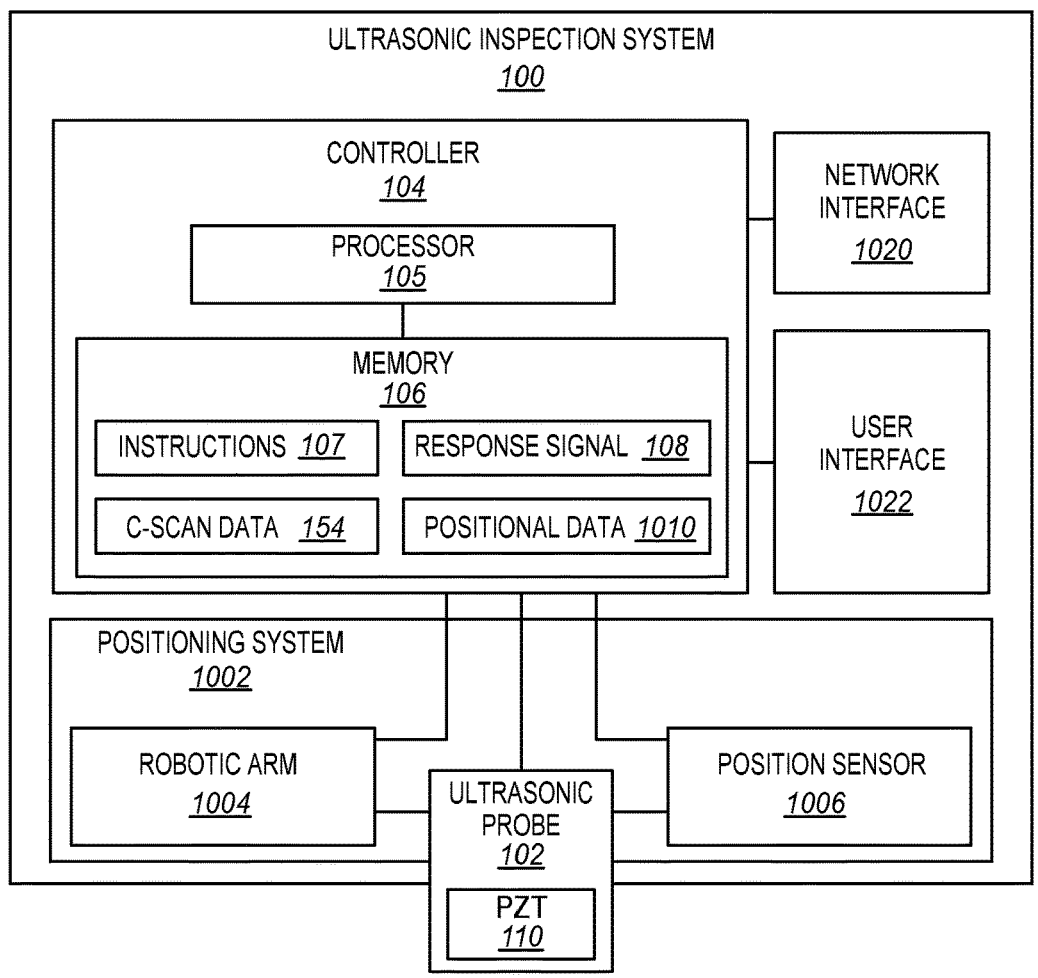
FIG. 10 is another block diagram of an ultrasonic inspection system in an illustrative embodiment.

Ultrasonic probe 102 may be manually moved by an operator in order to inspect structure 120 as described above. In another embodiment, ultrasonic inspection system 100 may be automated to move ultrasonic probe 102 for inspection. FIG. 10 is another block diagram of ultrasonic inspection system 100 in an illustrative embodiment. In this embodiment, ultrasonic inspection system 100 further includes a positioning system 1002, which is configured to move ultrasonic probe 102 to different positions along front wall 122 of structure 120. In this embodiment, positioning system 1002 includes a robotic arm 1004 and a position sensor 1006 (or multiple position sensors). Ultrasonic probe 102 is mounted or attached to robotic arm 1004 on an end effector or the like. As robotic arm 1004 moves or sweeps ultrasonic probe 102 along structure 120, data is sent to controller 104 for processing. Robotic arm 1004 is automatically controlled to move ultrasonic probe 102 proximate to structure 120 based on commands from controller 104. Robotic arm 1004 generally includes multiple-axis movement capabilities and uses software support to generate a three-dimensional profile to be used for measurement and inspection of structure 120. Position sensor 1006 is configured to determine positional data 1010 for ultrasonic probe 102 in a coordinate system of structure 120 (e.g., X, Y, and Z in three-dimensional space). Robotic arm 1004 and position sensor 1006 may communicate with controller 104 via a wired connection or a wireless connection.

In operation, robotic arm 1004 moves ultrasonic probe 102 to a first position relative to front wall 122 of structure 120. At the first position, ultrasonic probe 102 and controller 104 perform an inspection as described in method 400 to determine an energy sum of the rectified signal 602 at the first position. When generating C-scan data 154, for example, controller 104 converts the energy sum for the first position to a display value, such as a shade of gray or a color value. Controller 104 also receives the positional data 1010 for the first position from position sensor 1006, and associates the positional data 1010 for the first position with the display value. Controller 104 may store this information as C-scan data 154. Robotic arm 1004 then moves ultrasonic probe 102 to a second position relative to front wall 122 of structure 120. At the second position, ultrasonic probe 102 and controller 104 perform an inspection as described in method 400 to determine an energy sum of the rectified signal 602 at the second position. Controller 104 converts the energy sum for the second position to a display value, receives the positional data 1010 for the second position from position sensor 1006, and associates the positional data 1010 for the second position with the display value. This process repeats for multiple positions, such as to generate the C-scan data 154 for structure 120.

In another embodiment, ultrasonic inspection system 100 may further include a network interface 1020 and/or a user interface 1022. Network interface 1020 is a hardware component configured to communicate with a remote device over a network using a wired or wireless connection. Controller 104 may transmit the C-scan data 154 to the remote device over a network using network interface 1020. User interface 1022 is a hardware component for interacting with an end user or operator. For example, user interface 1022 may include a screen or touch screen (e.g., a Liquid Crystal Display (LCD), a Light Emitting Diode (LED) display, etc.), a keyboard or keypad, a tracking device (e.g., a trackball or trackpad), a speaker, and a microphone. Controller 104 may display the C-scan data 154 to an operator through user interface 1022.

Figure 11:
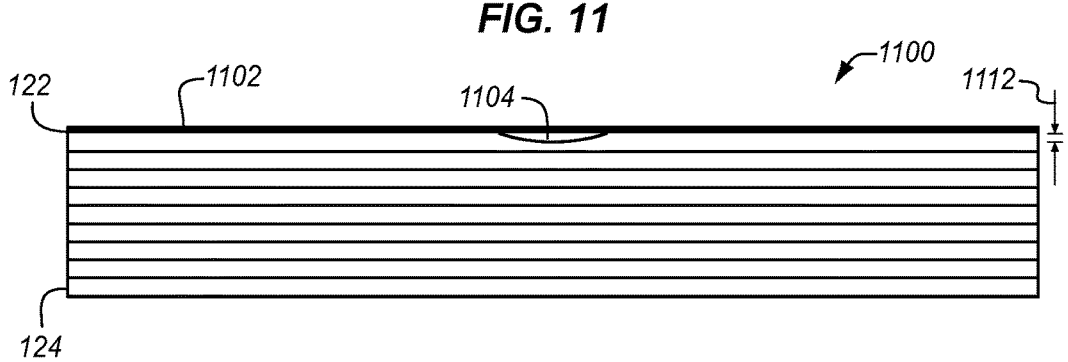
FIG. 11 is a cross-sectional view of a composite part in an illustrative embodiment.

FIGS. 11-18 provide an example of ultrasonic testing in another embodiment. FIG. 11 is a cross-sectional view of a composite part 1100 in an illustrative embodiment, which is an example of structure 120 discussed above. Composite part 1100 is a laminated structure comprised of multiple layers of material (e.g., Carbon Fiber Reinforced Polymer (CFRP)) that are sandwiched together. Individual fibers within each layer of the laminate may be aligned parallel with each other, but different layers may exhibit different fiber orientations in order to increase the strength of the resulting composite part along different dimensions. The laminate also includes a resin (e.g., thermoset or thermoplastic) that solidifies, and hardens the layers of the laminate into composite part 1100. Like structure 120, composite part 1100 includes a front wall 122 and a back wall 124. In this example, an opaque layer 1102 is applied or disposed on front wall 122. For example, opaque layer 1102 may be a primer, paint, coating, surface film, etc., that is not transparent. Opaque layer 1102 may be co-cured with composite part 1100. FIG. 11 also illustrates a resin pool 1104 beneath front wall 122, which is not visible with a visual inspection method due to opaque layer 1102. Resin pool 1104 represents an anomaly or imperfection beneath front wall 122 that can negatively affect the integrity of composite part 1100, as it may represent a potential crack-initiation site. Resin pool 1104 is illustrated as having a depth 1112 beneath front wall 122. Due to the close proximity of resin pool 1104 to front wall 122, it may be located in a near-surface dead zone 304 and is undetectable with traditional inspection techniques. However, resin pool 1104 is detectable using an inspection method as described herein.

Figure 12:
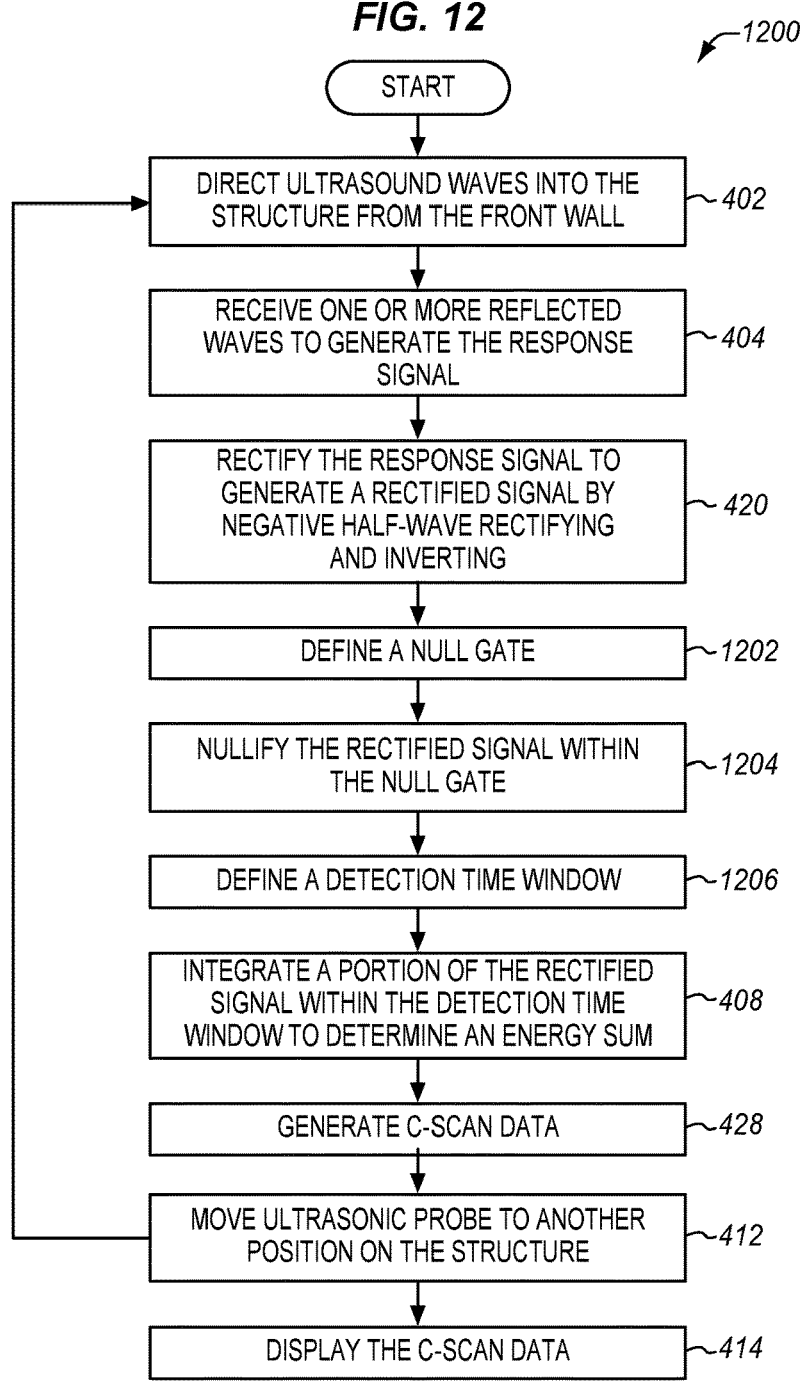
FIG. 12 is a flow chart illustrating a method of inspecting a structure in an illustrative embodiment.
Figure 13:
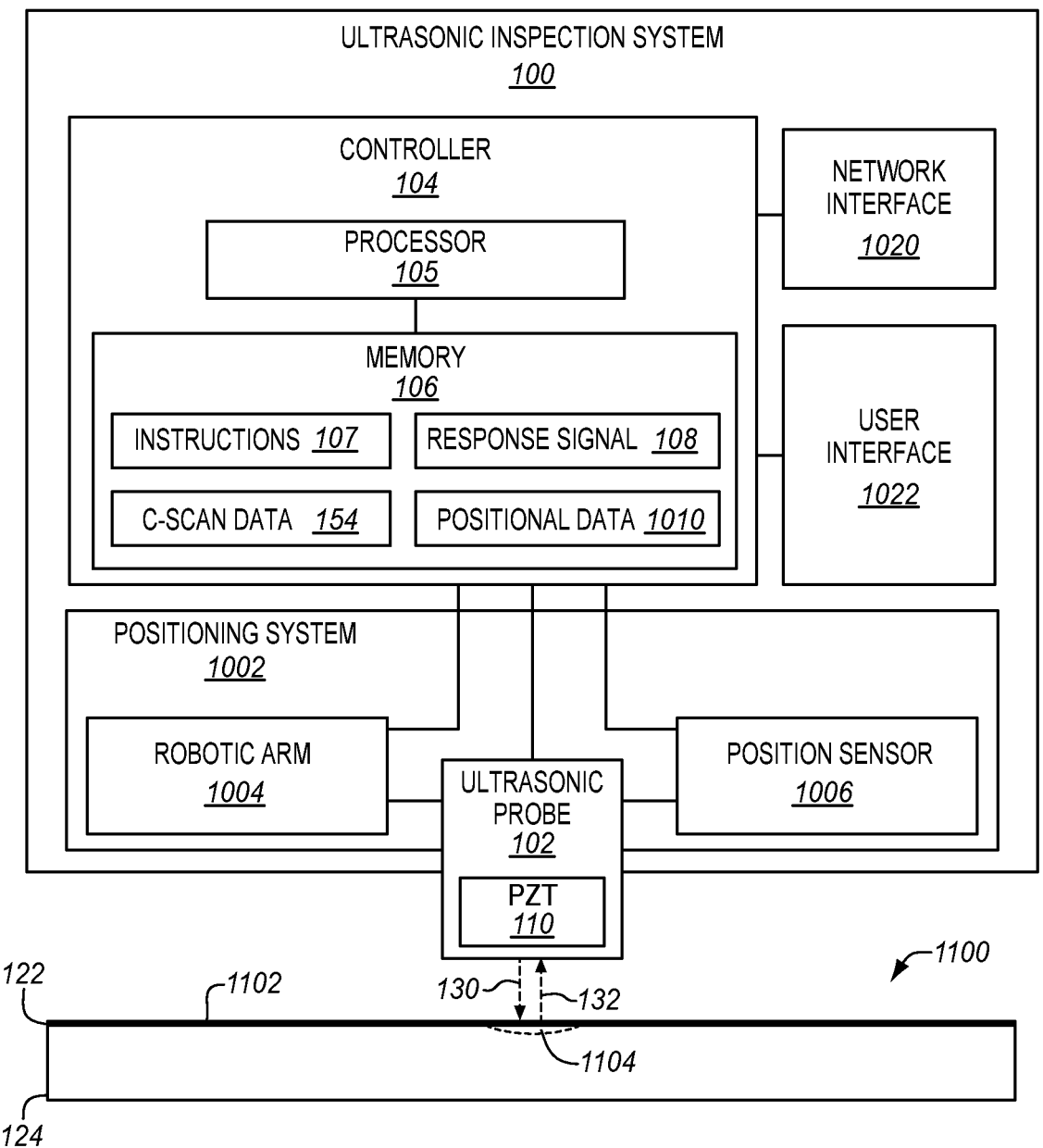
FIG. 13 illustrates an ultrasonic inspection system positioned proximate to a composite part in an illustrative embodiment.

FIG. 12 is a flow chart illustrating a method 1200 of inspecting a structure in an illustrative embodiment, such as composite part 1100. However, it is understood that method 1200 may be used to inspect other types of structures. Method 1200 may include similar steps as described above for method 400, and those steps are labeled with the same reference number.

Figure 14:
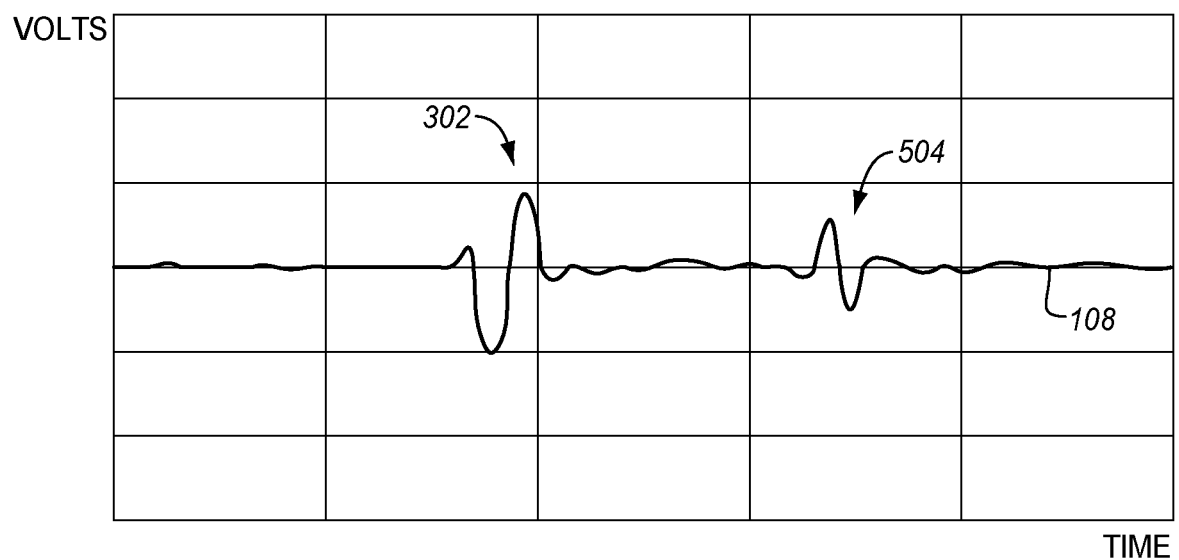
FIG. 14 is a graph illustrating a response signal in an illustrative embodiment.

To begin, ultrasonic probe 102 is positioned proximate to front wall 122 of composite part 1100 (see FIG. 13), and operates in pulse-echo mode to inspect composite part 1100 at this position. Ultrasonic probe 102 directs ultrasound waves 130 into composite part 1100 from front wall 122 (see step 402 of FIG. 12). Ultrasound waves 130 that are reflected return to ultrasonic probe 102, and are converted into a response signal 108. Thus, ultrasonic probe 102 receives one or more reflected waves 132 to generate the response signal 108 (step 404). Controller 104 receives the response signal 108 from ultrasonic probe 102, and stores or buffers the response signal 108. FIG. 14 is a graph 1400 illustrating response signal 108 in an illustrative embodiment. Graph 1400 shows a front wall reflection 302 and a back wall reflection 504, which represent reflections of ultrasound waves 130 off of front wall 122 and back wall 124, respectively. Response signal 108 represents raw A-scan data for composite part 1100 at this position.

Figure 15:
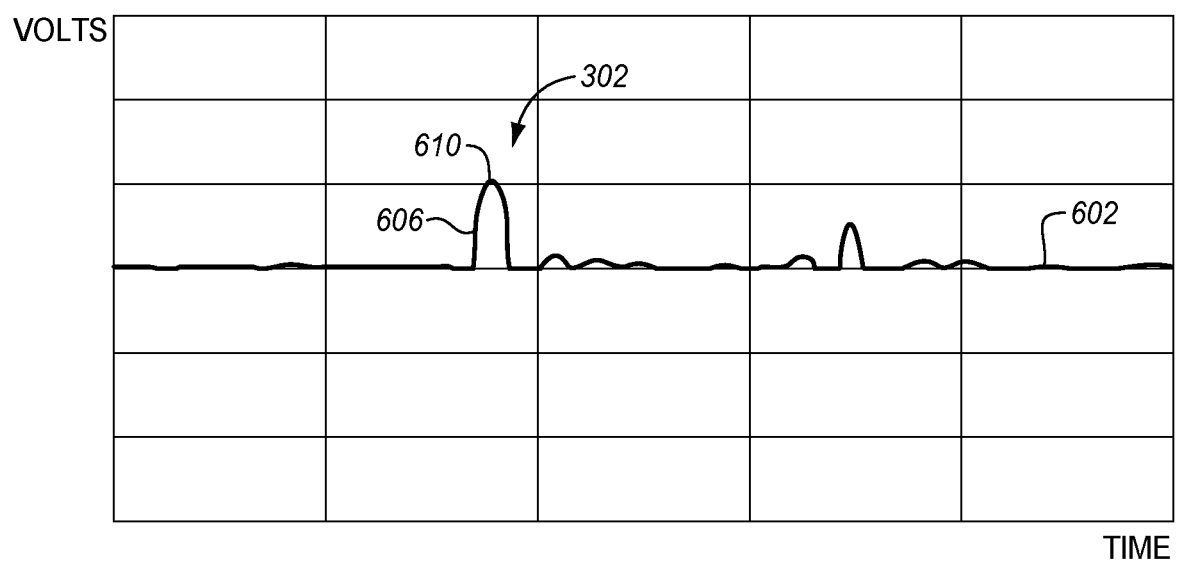
FIG. 15 is a graph illustrating a rectified signal in an illustrative embodiment.

In FIG. 12, controller 104 processes the response signal 108 as follows. Controller 104 rectifies the response signal 108 to generate a rectified signal by negative half-wave rectifying the response signal 108 and inverting (step 420). FIG. 15 is a graph 1500 illustrating the rectified signal 602 in an illustrative embodiment. Rectified signal 602 includes a series of pulses. The pulse (i.e., front wall pulse 606) having the first highest peak 610 in rectified signal 602 represents the front wall reflection 302. Although negative half-wave rectifying was used in this embodiment, other types of rectifying may be used as described above.

Figure 16:
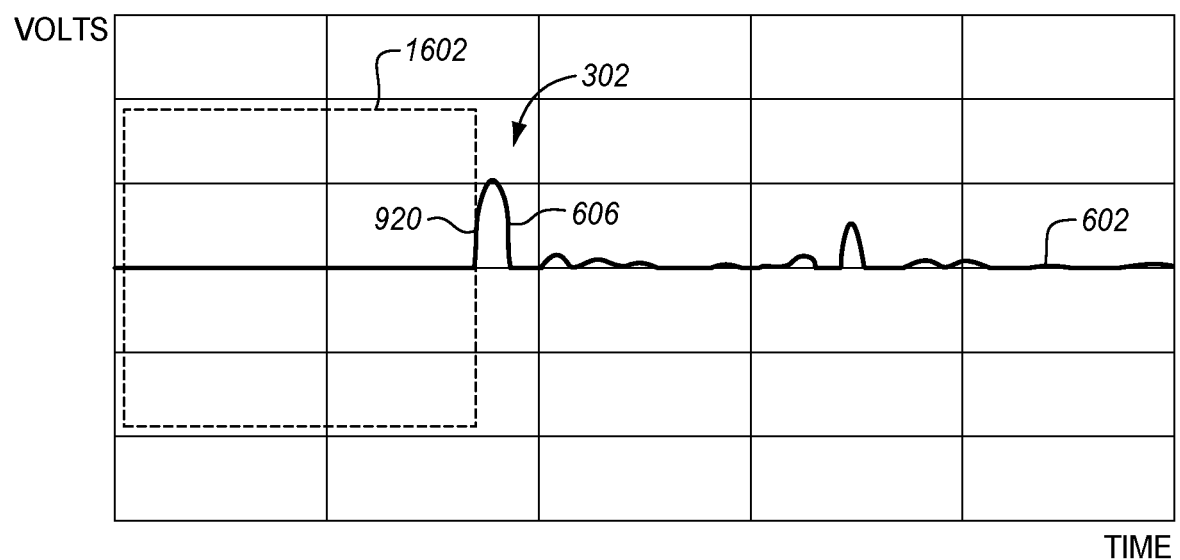
FIG. 16 is a graph illustrating a null gate in an illustrative embodiment.

In FIG. 12, controller 104 defines a null gate preceding the front wall reflection 302 in the rectified signal 602 (step 1202), and nullifies the rectified signal 602 within the null gate (step 1204). FIG. 16 is a graph 1600 illustrating a null gate 1602 in an illustrative embodiment. Null gate 1602 is used to "zero-out" a portion of the rectified signal for a time interval preceding the front wall reflection 302. Thus, null gate 1602 begins at a time preceding the front wall reflection 302, and ends where the front wall reflection 302 starts. For example, controller 104 may define the end of the null gate 1602 to be at the rising edge 920 of the front wall reflection 302 (i.e., at front wall pulse 606) or where the rising edge 920 of the front wall reflection 302 exceeds a threshold voltage (e.g., 0.4 volts). Controller 104 may further define the start of the null gate 1602 to be a number of samples preceding the rising edge 920 (e.g., 150 samples). The portion of the rectified signal 602 within null gate 1602 is taken to a baseline voltage (e.g., zero volts) so that any pulses preceding the front wall reflection 302 do not falsely trigger as the front wall reflection 302 in the rectified signal 602.

Figure 17:
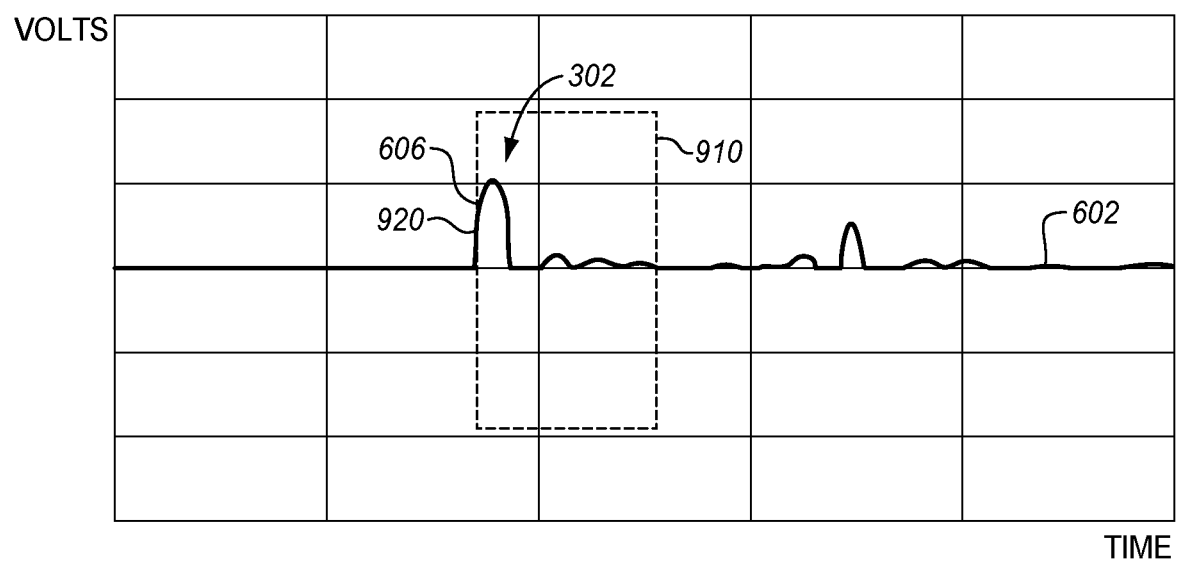
FIG. 17 is a graph illustrating a detection time window in an illustrative embodiment.

In FIG. 12, controller 104 defines a detection time window 910 or a detection gate (step 1206). FIG. 17 is a graph 1700 illustrating a detection time window 910 in an illustrative embodiment. As above, detection time window 910 is limited or restricted to front wall 122 and the detection gap 210 beneath the front wall 122. In this embodiment, controller 104 defines the detection time window 910 to begin at the front wall reflection 302 (i.e., at front wall pulse 606). For example, detection time window 910 may begin at the rising edge 920 of the front wall reflection 302, or where the rising edge 920 of the front wall reflection 302 exceeds a threshold voltage (e.g., 0.4 volts). The detection time window 910 ends a fixed time following the rising edge 920. Detection time window 910 therefore exclusively encompasses the front wall reflection 302 and the near-surface dead zone 304 following the front wall reflection 302. The size of the detection time window 910 in this embodiment may be provisioned based on an estimated depth 1112 of resin pool 1104 beneath front wall 122. It is noted that when the portion of the rectified signal 602 preceding the front wall reflection 302 is nullified as in step 1204, detection time window 910 may begin prior to the front wall reflection 302. Regardless of where detection time window 910 begins, detection time window 910 ends at or before the nearest inspectable depth 214 so that only the front wall 122 and the detection gap 210 directly below the front wall 122 are considered.

In FIG. 12, controller 104 integrates a portion of the rectified signal 602 within the detection time window 910 (step 408). By integrating within the detection time window 910, controller 104 determines an energy sum of the portion of the rectified signal 602 within detection time window 910. Controller 104 then generates C-scan data 154 based on the energy sum (step 428). For example, controller 104 converts the energy sum at this position to a display value, and associates positional data 1010 with the display value. Ultrasonic probe 102 is then moved to another position relative to the front wall 122 of composite part 1100 (step 412), and method 1200 repeats at the new position.

Figure 18:
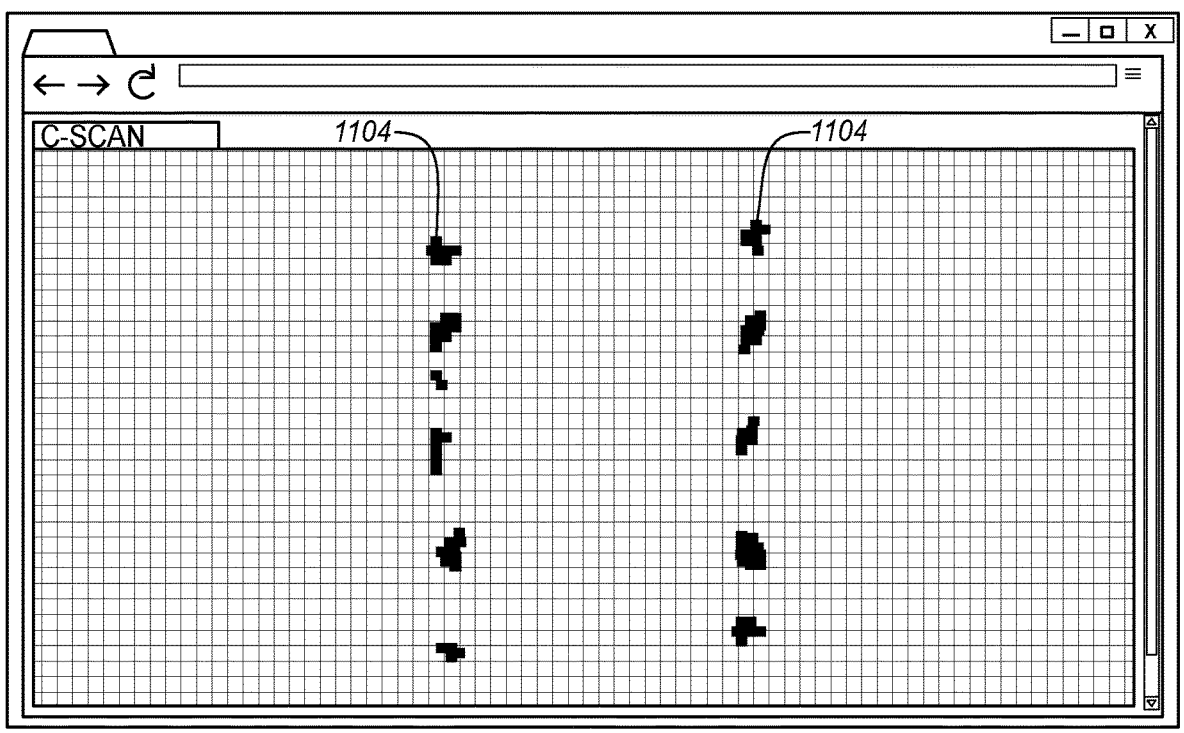
FIG. 18 is a C-scan presentation of C-scan data in an illustrative embodiment.

After scanning composite part 1100 or at least a portion of composite part 1100, controller 104 may send the C-scan data 154 to a remote device via network interface 1020 for display (step 414) by the remote device, or may display (step 414) the C-scan data 154 via user interface 1022. FIG. 18 is a C-scan presentation 1800 of the C-scan data 154 in an illustrative embodiment. C-scan presentation 1800 provides a plan view of composite part 1100 via a point cloud. Because controller 104 integrated the portion of the rectified signal 602 within detection time window 910 at each position along composite part 1100, the C-scan presentation 1800 indicates anomalies or imperfections directly below front wall 122 within the near-surface dead zone 304. In FIG. 18, the darker regions illustrate resin pools 1104 beneath front wall 122. One technical benefit is that an operator is able to detect where resin pools 1104 exist in composite part 1100 even though the resin pools 1104 are not visible due to opaque layer 1102 on the front wall 122. Another benefit is that because resin pools 1104 are detectable, opaque layer 1102 may be co-cured with composite part 1100 to save manufacturing time.

Again, although method 1200 was used to describe inspection of a composite part 1100, it may be used to inspect other types of structures. For example, method 1200 may be used to detect inclusions or voids beneath the front wall of a metal part.

Figure 19:
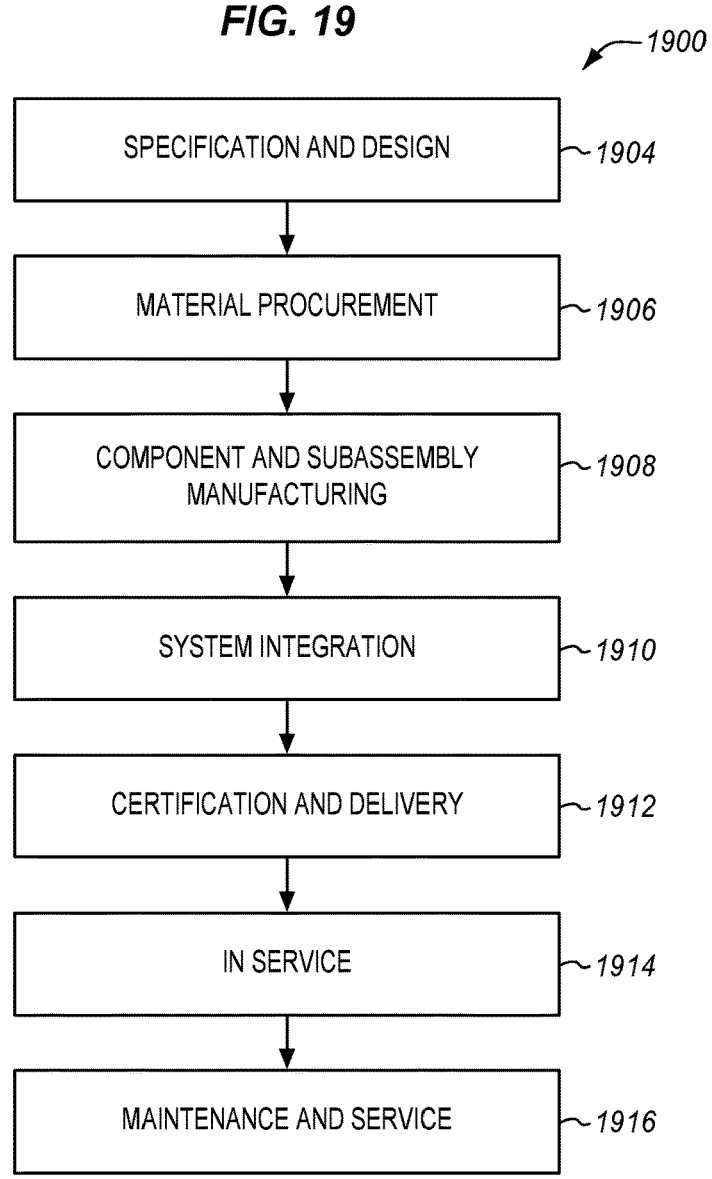
FIG. 19 is a flow chart illustrating an aircraft manufacturing and service method in an illustrative embodiment.
Figure 20:
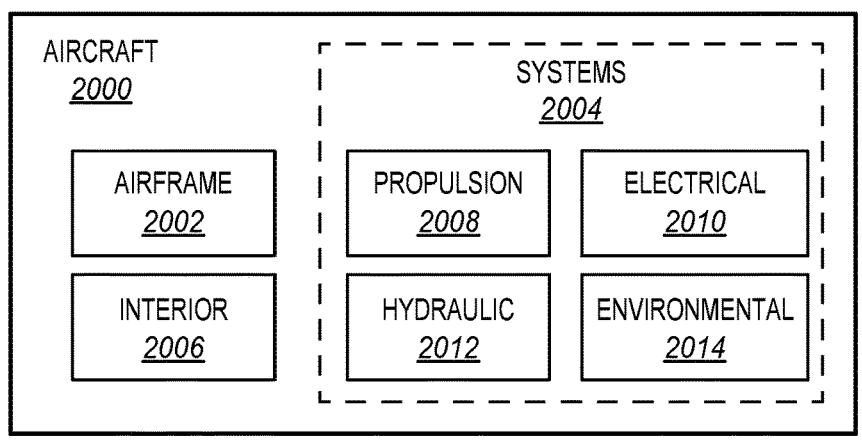
FIG. 20 is a schematic diagram of an aircraft in an illustrative embodiment.

The embodiments of the disclosure may be described in the context of an aircraft manufacturing and service method 1900 as shown in FIG. 19 and an aircraft 2000 as shown in FIG. 20. During pre-production, exemplary method 1900 may include specification and design 1904 of aircraft 2000, and material procurement 1906. During production, component and subassembly manufacturing 1908 and system integration 1910 of aircraft 2000 takes place. Thereafter, aircraft 2000 may go through certification and delivery 1912 in order to be placed in service 1914. While in service by a customer, aircraft 2000 is scheduled for routine maintenance and service 1916 (which may also include modification, reconfiguration, refurbishment, and so on).

Each of the processes of method 1900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 20, aircraft 2000 produced by exemplary method 1900 may include an airframe 2002 with a plurality of systems 2004 and an interior 2006. Examples of high-level systems 2004 include one or more of a propulsion system 2008, an electrical system 2010, a hydraulic system 2012, and an environmental system 2014. Any number of other systems may be included. Although an aerospace example is shown, the principles described in this specification may be applied to other industries, such as the automotive industry.

Apparatus and methods embodied herein may be employed during any one or more of the stages of the production and service method 1900. For example, components or subassemblies corresponding to production process 1908 may be fabricated or manufactured in a manner similar to components or subassemblies produced while aircraft 2000 is in service. Also, one or more apparatus embodiments, method embodiments, or a combination thereof may be utilized during the production stages 1908 and 1910, for example, by substantially expediting assembly of or reducing the cost of aircraft 2000. Similarly, one or more of apparatus embodiments, method embodiments, or a combination thereof may be utilized while aircraft 2000 is in service, for example and without limitation, to maintenance and service 1916.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. An ultrasonic inspection system, comprising:
an ultrasonic probe configured to direct ultrasound waves into a structure from a front wall, and to receive reflected waves to generate a response signal; and
a processor configured to rectify the response signal to generate a rectified signal, to integrate a portion of the rectified signal within a detection time window to determine an energy sum, and to generate output based on the energy sum;
wherein the detection time window is restricted to a front wall reflection and at least a portion of a near-surface dead zone following the front wall reflection.

2. The ultrasonic inspection system of claim 1 wherein:
the processor is configured to negative half-wave rectify and invert the response signal to generate the rectified signal.

3. The ultrasonic inspection system of claim 1 wherein:
the processor is configured to positive half-wave rectify the response signal to generate the rectified signal.

4. The ultrasonic inspection system of claim 1 wherein:
the processor is configured to full-wave rectify the response signal to generate the rectified signal.

5. The ultrasonic inspection system of claim 1 wherein:
the processor is configured to define a null gate preceding the front wall reflection, and to nullify the rectified signal within the null gate.

6. The ultrasonic inspection system of claim 1 wherein:
the processor is configured to generate C-scan data for the structure based on the energy sum.

7. The ultrasonic inspection system of claim 6 further comprising:
a robotic arm configured to move the ultrasonic probe over the structure; and
a position sensor configured to determine positional data for the ultrasonic probe.

8. The ultrasonic inspection system of claim 1 wherein:
the processor is configured to trigger an alert when the energy sum exceeds a threshold.

9. The ultrasonic inspection system of claim 1 wherein:
the structure comprises a composite part.

10. The ultrasonic inspection system of claim 9 wherein:
an opaque layer is disposed on the front wall of the composite part; and
the detection time window is provisioned based on a depth of a resin pool beneath the front wall.

11. The ultrasonic inspection system of claim 1 wherein:
the structure comprises a part of an aircraft.

12. A method of inspecting a structure, the method comprising:
directing ultrasound waves into the structure from a front wall;
receiving reflected waves to generate a response signal;
rectifying the response signal to generate a rectified signal;
integrating a portion of the rectified signal within a detection time window to determine an energy sum; and
generating output based on the energy sum;
wherein the detection time window is restricted to a front wall reflection and at least a portion of a near-surface dead zone following the front wall reflection.

13. The method of claim 12 wherein rectifying the response signal comprises:
    negative half-wave rectifying and inverting the response signal to generate the rectified signal.

14. The method of claim 12 wherein generating the output based on the energy sum comprises:
    generating C-scan data for the structure based on the energy sum.

15. The method of claim 12 wherein generating the output based on the energy sum comprises:
    triggering an alert when the energy sum exceeds a threshold.

16. The method of claim 12 wherein:
    the structure comprises a composite part;
    an opaque layer is disposed on the front wall of the composite part; and
    the detection time window is provisioned based on a depth of a resin pool beneath the front wall.

17. A non-transitory computer readable medium embodying programmed instructions executed by a processor, wherein the instructions direct the processor to implement a method of inspecting a structure, the method comprising:
    directing ultrasound waves into the structure from a front wall;
    receiving reflected waves to generate a response signal;
    rectifying the response signal to generate a rectified signal;
    integrating a portion of the rectified signal within a detection time window to determine an energy sum; and
    generating output based on the energy sum;
    wherein the detection time window is restricted to a front wall reflection and at least a portion of a near-surface dead zone following the front wall reflection.

18. The computer readable medium of claim 17 wherein rectifying the response signal comprises:
    negative half-wave rectifying and inverting the response signal to generate the rectified signal.

19. The computer readable medium of claim 17 wherein generating the output based on the energy sum comprises:
    generating C-scan data for the structure based on the energy sum.

20. The computer readable medium of claim 17 wherein generating the output based on the energy sum comprises:
    triggering an alert when the energy sum exceeds a threshold.

* * * * *